May 9, 1950     J. R. WHITENACK     2,507,129
VERTICAL SHAPER
Filed Aug. 2, 1945     4 Sheets-Sheet 1
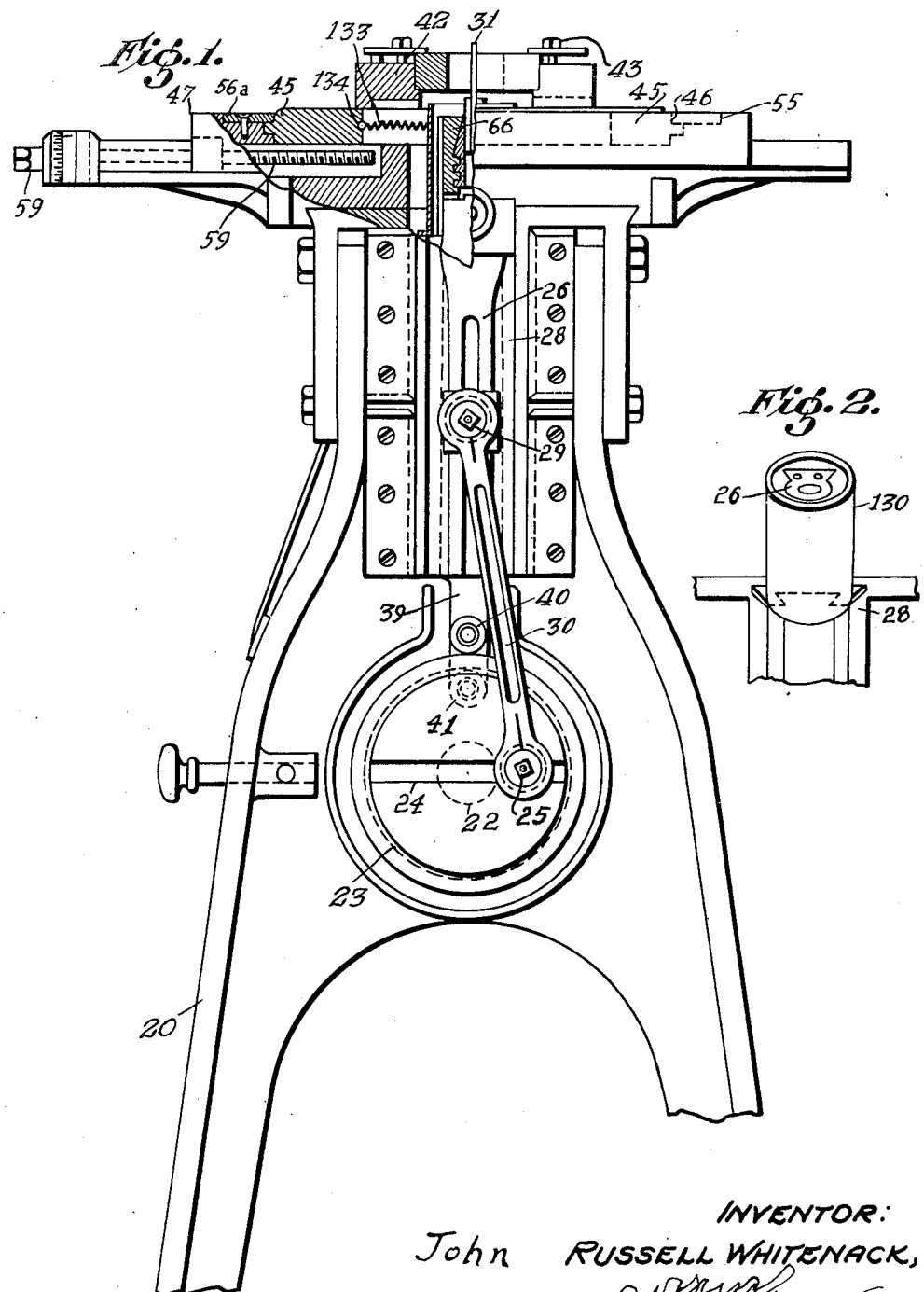
INVENTOR:
John Russell Whitenack,
By *J.B.M.Lurr*
ATTORNEY

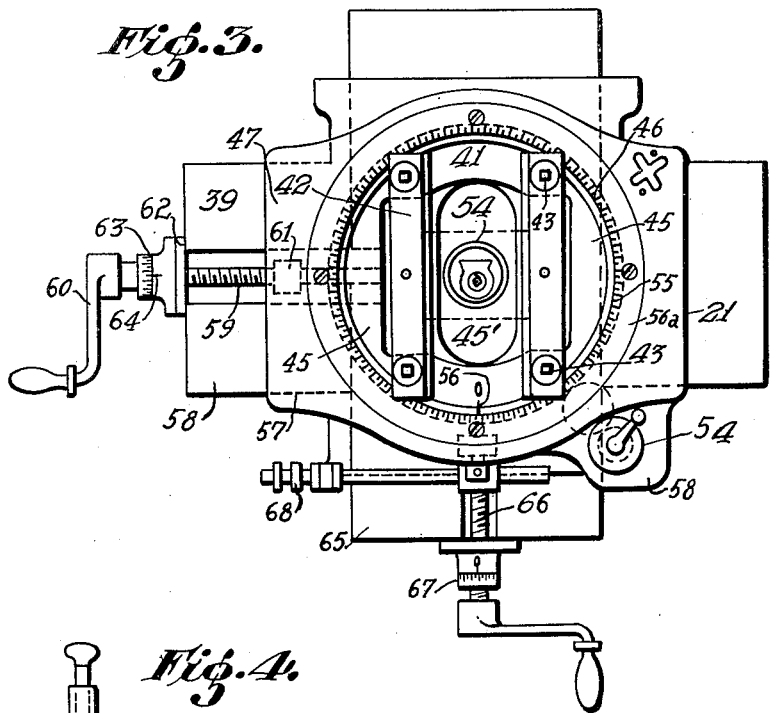
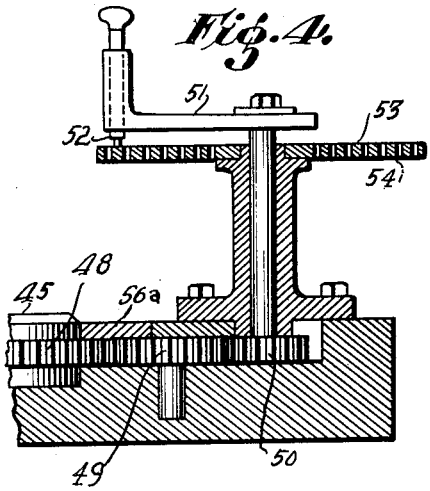
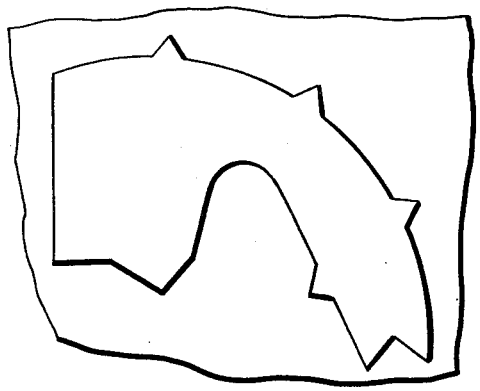

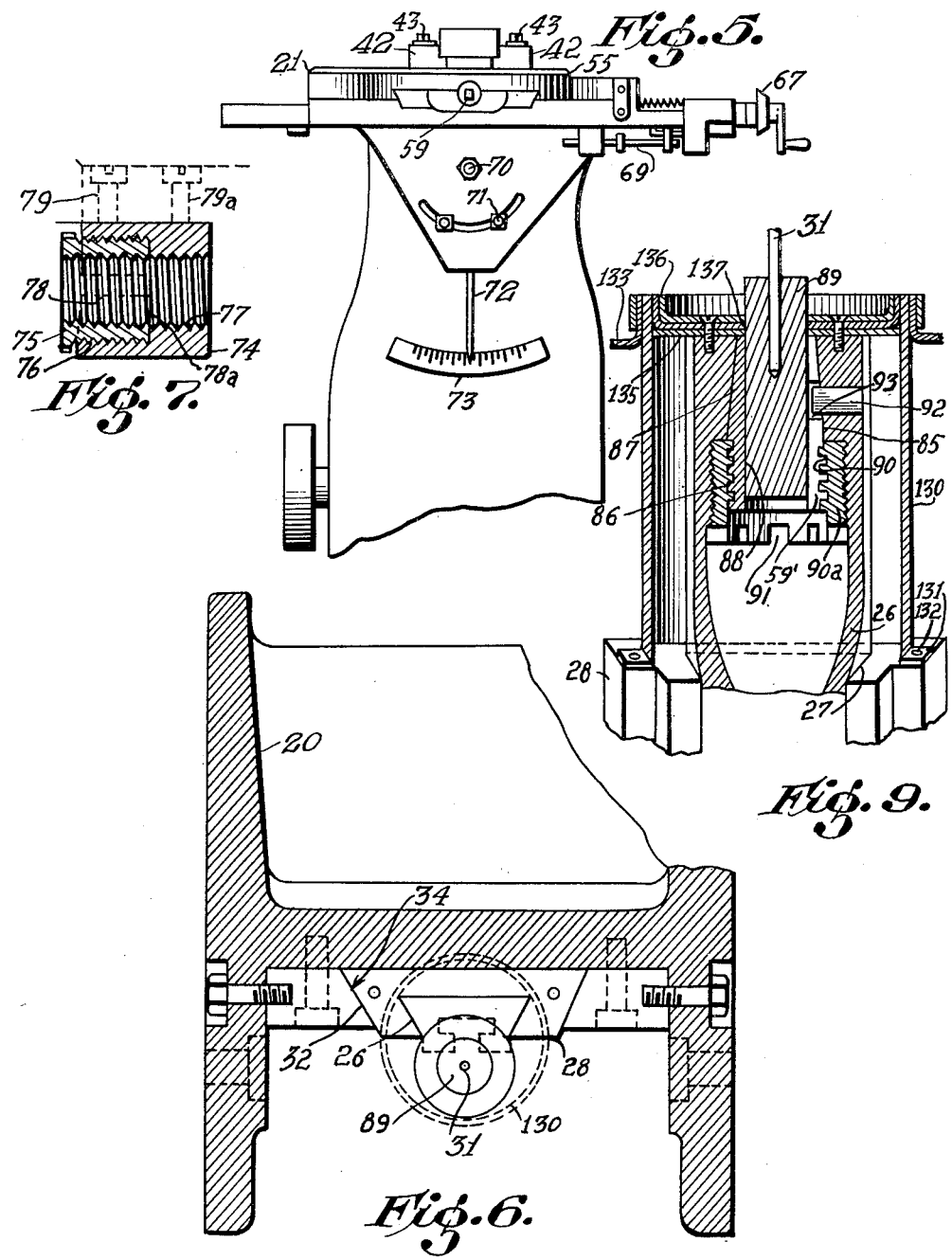

May 9, 1950     J. R. WHITENACK     2,507,129
VERTICAL SHAPER
Filed Aug. 2, 1945                               4 Sheets-Sheet 4
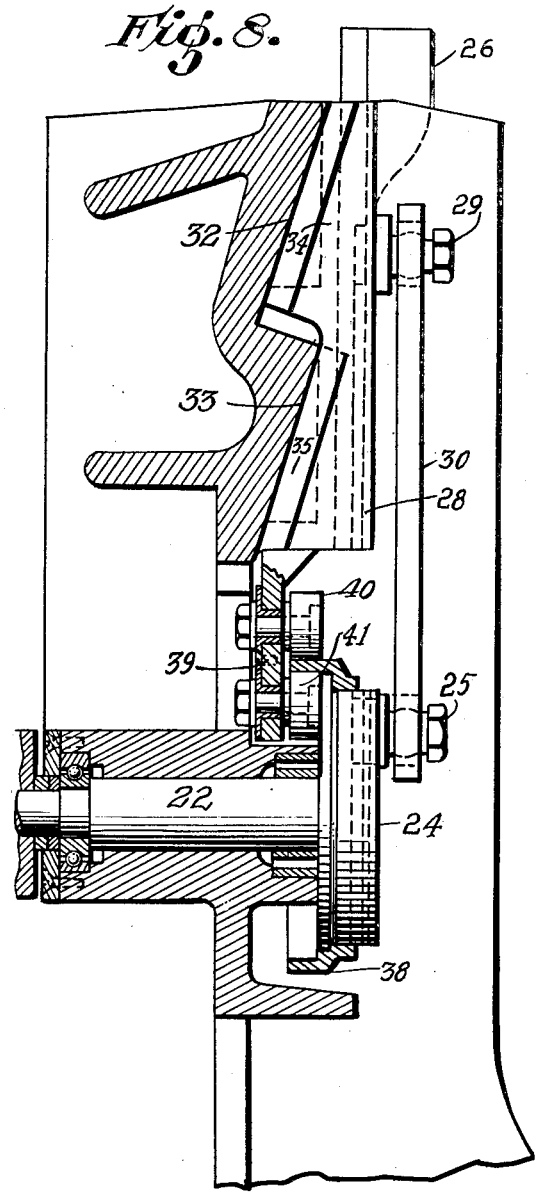
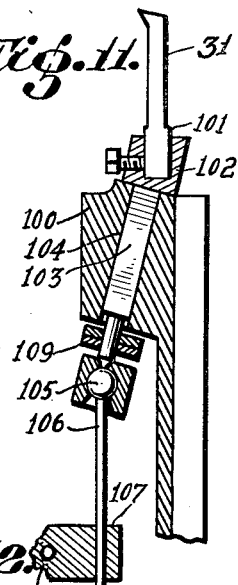
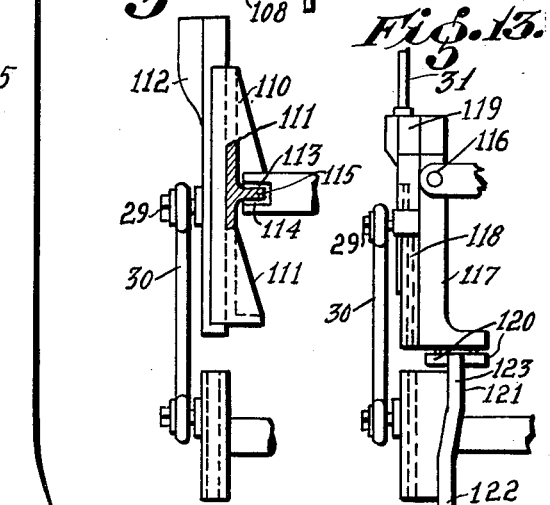
INVENTOR
John RUSSELL WHITENACK,
BY J. B. McGirr
ATTORNEY

UNITED STATES PATENT OFFICE 2,507,129

VERTICAL SHAPER

John Russell Whitenack, New York, N. Y.

Application August 2, 1945, Serial No. 608,455

8 Claims. (Cl. 90—45)

This invention relates to that class of metal cutting machines in which the cutting tool is reciprocated in a straight line motion, as for example in the machines known as shapers.

It is an object of this invention to provide a machine of the class described which can be used advantageously on a wider variety of work than existing machines and which on many classes of work will make possible a greater degree of accuracy with less expenditure of time and effort.

It is a further object to provide a machine that will perform work requiring the use of slender tools, with greater accuracy and at higher speed with a minimum interruption to sharpen the cutting tool.

It is a further object to provide a machine in which the progress of the work can be carefully examined with ease at all times during the operation of the machine.

One class of work for which the machine is particularly adapted is the making of stamping dies, which have small openings. The small size of these openings would require correspondingly slender cutting tools, which, cannot be made to do the work satisfactorily, quickly or continuously in existing machines.

It is a further object of this invention to provide a machine which will handle this type of work, at a high rate of speed without unduly dulling the tool, and at the same time which will leave the operation under complete control, both visible and mechanical, at all times.

Existing machines are generally, primarily intended for exterior cutting where the size of the cutting tool and where the strength and the weight of the machine parts are not limited. The cutting tool is generally mounted upon a clapper which positively holds the tool in place during the cutting stroke, but permits it to be pushed out of the way by contact with the work upon the idling stroke.

With such machine generally, the weight of the ram and the construction of the clapper limit the speed of operation of the machine. This is, however, not of great significance where sturdy tools are used, as the slow speed can be compensated for by taking heavier cuts.

Satisfactory results cannot be obtained in cutting small openings, where slender tools are required. The flexibility of such tools prevent the use of heavy cuts, and when cuts within the rigidity of the tool are taken, the operation becomes too slow. Thus, it will be seen that while with the sturdy tools and heavy cuts, the machine may be used to the full capacity of the steel of which the tool is made, when the slender tools are used, the capacity cannot be utilized.

It is an object of this invention to provide a machine which even with light high speed tools can utilize the full cutting capacity of the tool and continue to operate for long periods of time satisfactorily.

Another factor which prevents the speeding up of existing machines with slender tools is the operation of the clapper mechanism, where the tool is dragged backwards over the work on the idling stroke at high speeds, the cutting edge of the tool is rapidly worn off and it quickly comes to the point where it will not cut on the cutting stroke, but on the contrary it springs away from the work and slides over it without cutting.

It is an object of this invention to provide a machine in which the tool is kept completely out of contact with the work during the idling stroke, so that the tool will not become dulled and it is a further object to provide a means for giving tool relief which is positive in its action and which can be operated at high speed without difficulty.

The successful operation of a slender tool at high speed makes it desirable to grind the tool to a sharper angle than is customary with larger tools. With such construction, the chips bearing upon the rake face of the tool tend to hold the cutting edge in cutting position. Such a tool, however, because of its sharper angle has less backing to the cutting edge and is more easily dulled by riding upon the work during the back stroke.

It is a further object of this invention therefore to provide a machine which can utilize the most advantageous cutting angles for the tool and yet permit the tool to maintain its sharp condition for a long period of time.

Where heavy cuts are made, the metal at the finishing end of the cut bends over into a burr or breaks away interfering with the sharp well-defined edge many articles require. Such trouble is not experienced, however, at the initial edge of the cut.

It is a further object therefore to provide a machine which can be made to cut either upon the upstroke, as for example where light feed is employed or upon the down stroke as where heavy feeds are desired, with positive tool relief upon the idling stroke in either case.

It is a further object of this invention to provide a machine which can be operated either with firm tools and correspondingly heavy cuts, or with slender tools and light cuts without burring or breaking away at the critical edges.

Existing machines usually have the tool reciprocate horizontally so that the layout carrying face of the work lies in a vertical plane, and the tool carrying head or ram, extends over the tool, and moves over the work. This arrangement makes it difficult accurately to inspect the progress of the work without stopping the machine and taking out the work, and the progress of the tool as it cuts the work is not directly visible.

Machines have been proposed in which the ram reciprocates vertically above the work. Such machines propose to provide a reciprocating follower support for the lower end of the tool, so that the tool would be to that extent, pulled in both directions. This would permit the layout face of the work to lie in a horizontal plane, but the reciprocating ram just above the cutting point precludes any careful examination of the progress of the work during the operation of the machine. Even if the machine be stopped for the purpose of inspecting the work, nevertheless the ram and tool holder are in the way of direct vision.

The layout is scribed or otherwise marked upon the upper surface of the work piece whereas the cutter comes up from below and then comes to rest just slightly above the level of the work piece. This construction makes direct inspection in alignment with the cutting stroke of the tool very simple. It also makes it possible to mount a microscope or other magnifier directly over the work so that the full benefit of such magnification can be attained without any trouble with parallax errors.

It is a further object of this invention to provide a machine in which the work piece may be held face upward, with the layout clearly visible from directly above it, and in direct alignment with the motion of the tool, and in which none of the supporting operating parts lie above the face.

More particularly it is an object to provide a machine in which the tool itself is moved from below, to a point preferably only slightly above the layout face, so that the operator may watch the actual relation of the cutting tool to work while the machine is in operation. Moreover, since, as will be later described, the tool can be reciprocated at rates of ten or more strokes, approximately, per second and, in effect, pauses at the top of the stroke, the successive images of the tool can be made to blend stroboscopically into a single image in its actual cutting relation to the work.

It is a further object to provide a machine which can be operated at much higher speeds than is now customary without injury either to the machine or to the tool.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Fig. 1 is a front elevation of a machine embodying this invention, parts being shown in section. Fig. 2 is a perspective view of a detail. Fig. 3 is a top plan view, the dotted lines representing the operating parts lying below the table being omitted. Fig. 4 is a sectional detail of the dividing head. Fig. 5 is a side elevation of the machine. Fig. 6 is partial sectional view of a detail of the slide support. Fig. 7 is a perspective view of a nut that may be used on the micrometer screws. Fig. 8 is a fragmentary section on the line VIII—VIII of Fig. 1. Fig. 9 is a fragmentary central section through the ram and tool holder. Fig. 10 is a plan of a die such as the machine is adapted to make. Figs. 11, 12, and 13, are fragmentary details showing alternative methods of providing tool relief.

As will be seen from Fig. 1, the machine comprises primarily a frame 20, carrying at its upper end a horizontal work table 21. As shown in the drawings, all the operating mechanism of the machine is carried below the work table, so that the latter has its upper face fully exposed to view. To this end there is journalled within the frame a drive shaft 22 carrying a slotted disc 23 which serves as an adjustable and reversible crank arm to drive the tool. This disc is provided with a diametrical T-shaped slot 24 within which a pivot pin 25 may be clamped at any point. A reciprocating ram 26 is mounted to slide in vertical guides 27 carried by a head 28 mounted on the frame 20 as will be described. This ram carries a pivot pin 29. A connecting rod 30 connects the pins 25 and 29, and thus vertically reciprocates the ram 26. Each of the pins 25 and 29 connects to the connecting rod with a spherical bearing to take care of the lateral motion of the head 28. The ram 26 is rigidy connected to the cutting tool 31 as will be hereafter described.

In accordance with this invention, the tool is positively moved away from the cutting line, after the close of the effective portion of the cutting stroke, and is returned to its initial position completely out of contact with the work. To accomplish this result there is provided upon the frame 20 guideways which are inclined upwardly toward the work, as here shown two such guideways 32 and 33 are employed to give greater compactness to the machines. The head 28 has a pair of corresponding guides 34 and 35, so that when it is moved up and down in the guideways 32 and 33, the head 28 itself will be moved toward and from the cutting face, and will carry the ram 26 and the cutting tool 31 with it.

Mounted upon the shaft 22 is a hollow cylindrical cam 38, while the head 28 has a downward extension 39 upon which are journalled a pair of rollers, 40 and 41, positioned to engage respectively the inside and the outside of the cylindrical cam 38. This cam is shaped to move the head 28 upward and toward the work face at the close of the idling stroke, and to move the head downwardly and away from the work face at the close of the cutting stroke. With this construction, it will be seen that the speed of the machine is not limited by any clapper arrangement because the machine does not have such an apparatus, on the contrary the tool is moved positively away from the work while out of contact with the work and held out of contact until it is ready to start the next cutting stroke. By reason of the construction of the disc 23, the length of stroke can be varied at will, and the machine may be made to cut on either the up or down stroke by varying the position of the pin 25 in the slot.

The work may be held upon the work table in any practical manner, as for example, it may be clamped thereto by work holding clamp 42 held by the bolts 43.

The work table as a whole is rotatable, and is movable sideways and from front to back.

To accomplish the first of these motions, the work table takes the form of a circular block 45 movable in a recess 46, in a crosshead 47. This block 45 has gear teeth upon its outer face as shown at 48 in position to mesh with an idler gear 49 which in turn meshes with a pinion 50 driven by an arm 51. This arm has a spring pin 52 moving over the face of a disc 53 and provided with the usual equally spaced openings 54 to serve as a dividing head.

The outer face of the circular block 45 may carry a bevelled surface 55 graduated in degrees adapted to cooperate with an index 56.

The crosshead 47 is in turn mounted upon guideways 57 extending from side to side in a sliding support 58. A screw 59 under control of a handle 60 engaging a nut 61 upon the crosshead and rotatably connected to the sliding support at 62, moves the crosshead from side to side. This screw is preferably provided with a graduated scale 63 cooperating with an index 64 which may be designed, in proportion to the thread of the screw, so that each division will represent some standard fraction of an inch as for example a .001 of an inch.

The sliding support 58 is in turn mounted upon guides upon a base 65, which extend from front to back, of the machine and its position is in turn determined by a screw 66 similar to the screw 59 and also having a graduated scale 67 to indicate thousandths of an inch. In this manner, it will be seen the entire work table may be rotated or moved forward or back or laterally with micrometer adjustment at will. Fixed stops may be applied as shown at 68 and 69 to limit the movement of the work table in either direction. The base supporting the sliding support 58 may itself be carried upon a pivot 70 upon the frame 20 so as to be adjustable to different angular positions and it may be held in any adjusted position by bolts 71 while a pointer 72 moves over a graduated scale 73 to indicate the degree of inclination.

In Fig. 7, there is shown a practical means of taking up lost motion in the micrometer screws and as there shown, there is provided an outer nut 74 and an inner nut 75, the latter being threaded into the end of the outer nut as shown at 76 and the combined nut thus formed being tapped to provide a thread 77 to receive the adjusting screw 59. The outer nut 74 at a point where it embraces the inner nut 75, is slotted for about one half its length, at 78 and this slot may be carried part way around the circumference as at 78a. The combined nut thus formed is carried into the part to which it is attached and held therein by screws 79 and 79a. One of these screws passes across the slot 78 being threaded only into the second half so that as the screw is tightened, the nut 74 is tightened upon the inner nut 75. The nut 75 has a suitable turning device such as a hexagonal head by which it may be screwed into and out of the nut 74 thus taking up any lost motion in the threads.

In the form of the invention disclosed in Fig. 11, there is shown a modified form of providing the positive tool relief in which the ram 100 vertically reciprocates in its guides mounted upon the frame of the machine and the shank 101 of the tool is carried in a block 102 fastened to a sliding bar 103 in the ram 100. The bearing 104 for this sliding bar as will be seen from Fig. 11 is inclined in a direction away from the work face and it is pivotally connected at 105 to a rod 106 which is frictionally held in a block 107 pivoted to the frame at 108. With this construction, as the ram starts to move, it does not carry the tool with it because of the friction. Instead, the rod 106 slides in its bearing, moving the tool laterally toward or away from the work face. A stop 109 limits the movement of the bar in its bearings, and thereafter for the remainder of the stroke of the tool, the block 102 moves with the ram. In this manner, as the ram 100 is raised by the crank arm, the first effect is to slide the bar 103 in its bearing as far as the stop 109 will permit, thus moving the tool 31 toward the work face. As soon, however, as the parts 100 and 103 have reached the limit of their relative motion both ram and tool will be carried upwardly together, but the tool will then be in alignment with the work and hence will move through the cutting stroke.

At the close of this cutting stroke when the ram 100 starts to move downwardly, it will first slide upon the bar 103 because of the friction of the rod 106 and until it engages the stop. This relative motion moves the tool 31 away from the work face and out of vertical alignment with the cutting position. Further and continued movement downward of the ram moves the tool downwardly out of contact with the metal for the idling stroke.

It will be observed that the friction between the rod 106 and its bearing needs only to be sufficient to slide the bar 103 in its bearing and thus it imposes no serious work upon the driving mechanism.

In the form of the invention disclosed in Fig. 12, there is provided a head 110 movable upon inclined guides 111 similar to the inclined guides 32 and 33. This head 110, however, has frictional engagement with the ram 112 and has its motion limited both in the upward and downward position by stops 113, and 114 engaging above and below a finger 115 upon the ram. With this construction, it will be clear that as the ram moves upwardly, it carries the block 110 with it because of the friction between the ram and head, as far as the stops permit, and this action serves to move the slide toward the face of the work in position to effect the cutting. Further motion of the ram leaves the block at rest. At the commencement of the movement in the opposite direction, the same friction serves to move the block 110 downwardly and thus to withdraw the tool away from the cutting face. With this construction, to cut downwardly, the tool may be placed in the ram with the cutting edge to the rear.

In the form of the invention disclosed in Fig. 13, there is pivoted to the main frame at 116, a block 117 having guideways 118 in which the ram 119 may slide, the ram carrying the tool 31 as previously described. Upon the lower face of the block, there is provided a pair of rollers 120 adapted to engage opposite faces of a disc cam 121 carried upon the main drive shaft. This cam 121 is so designed as to tilt the block 117 about its pivot 116 at the close of each stroke of the tool holder and to this end as will be seen from the figure, the cam is composed of two separate portions 122 and 123 lying in different circumferential planes and connected by a curved portion 124 for moving the member. With this construction it will be seen the amount of tool relief is determined by the distance between the two circumferential planes of the cam and the speed with which the tool is moved at the end of its stroke is determined by the angle of the curved portion of the cam.

In Fig. 9, there is shown a practical form of holding the cutting tool in place, and as there is shown, the slide 26 is provided at its upper end with a tapered opening 85 immediately below which it is internally threaded as shown at 86.

Within the tapered surface, there is fitted a slotted tapered plug 87 having a bore 88 to receive the shank 89 of the tool 31, and having at its lower end an exterior thread 90 of coarser pitch than the threads 86.

A nut 90 has a male thread to mate with the thread 89, and it has a slotted head 91 by which it may be turned. With this arrangement as the nut is turned in either direction, it causes the tapered plug to move within the slide and thus the tool may be loosened or tightened from the slide. A key 92 extends through the wall of the tapered portion of the slide to engage an opening 93 in the tapered plug to prevent the latter from turning. This construction not only holds the tool firmly in place while facilitating its replacement, but it also makes it easy to remove or replace the tool from below, while the work is held in place. To protect the bearings against chips, there may be mounted upon the top of the head 28, a circular chip guard 130 having feet 131 by which it may be screwed to the top of the head as at 132. This guard is connected to the periphery of the central opening in the work table by an apron 133 which may be fastened by a ring 134. A disc 135 carrying a flexible washer 136 is attached to the upper end of the ram, adapted to fit within the guard and form a closure therefore, while sliding up and down with the movement of the ram. This disc has a central opening 137 through which the tool 31 or its shank may extend.

With the machine above described, it will be clear that slender tools may be used because the various features of the machine combine to permit light cuts at high speed without injury to the tool. At the same time, the actual cutting operation may be carefully inspected in alignment with the cutting stroke so that accuracy can be achieved with a minimum of trouble and labor.

It will also be clear that clean work may be obtained in all classes of work, since where light tools are employed working toward the layout face, burring will not occur because the cut is light. With heavier cuts, the machine may be reversed to cut away from the layout face and thus for that reason no burr will be left on the work face.

The positive and yet rhythmic relief movement of the cutting tool, and the fact that the movement of the ram and connecting rod are substantially in line with the cutting movement make it possible to operate the machine at high speeds without undue vibration and thus makes it possible to remove metal rapidly even with light feeds per stroke.

When the V-shaped cutting tool above described, is employed, it is possible to cut the metal rapidly on either side, without unduly bending a slender tool away from the work. This also facilitates rapid and accurate cutting.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram, and means to move said tool holder positively to move the tool toward the working face at the beginning of each working stroke and away from the working face at the beginning of each return stroke.

2. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram, said bearing being movably mounted on said frame for movement of said tool holder toward and from the working face, means for causing said movement, and means for rigidly controlling said last named movement to give rigid support to the said tool at all times and to move the tool toward the working face at the beginning of each working stroke and away from the working face at the beginning of each return stroke.

3. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram, said bearing being movably mounted on said frame for movement of said tool holder toward and from the working face, means positively driven by said ram, reciprocating means for causing said movement, and means for rigidly controlling said last named movement to give rigid support to the said tool at all times and to move the tool toward the working face at the beginning of each working stroke and away from the working face at the beginning of each return stroke.

4. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram, inclined vertical guides upon said frame within which said vertical bearings are rigidly supported, and means to slide said bearings in said guides at the beginning of each stroke of the ram to move the tool toward the working face at the beginning of each working stroke and away from the working face at the beginning of each return stroke.

5. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram, inclined vertical guides upon said frame within which said vertical bearings are rigidly supported, and means positively driven by the ram reciprocating means to slide said bearings in said guides at the beginning of each stroke of the ram to move the tool toward the working face at the beginning of each working stroke and away from the working face at the beginning of each return stroke.

6. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram and means to move said tool holder positively to move the tool toward the working face at the beginning of each working stroke and away from the working face at the beginning of each return stroke, said head having a tool access opening accessible from below the table through which the tool may be adjusted or replaced, and locking means for the tool and holder, accessible through said opening.

7. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram and means to move said tool holder positively to move the tool toward the working face at the beginning of each working stroke and away from the working face at the beginning of each return stroke, said head having a tool access opening accessible from below the table through which the tool may be adjusted or replaced, said opening terminating in an upwardly contracting tapered hole, said tool holder comprising a correspondingly tapered plug, and means controlled through said opening for forcing said plug upward into said tapered opening to hold the same rigidly in place.

8. A device of the character described comprising a frame, a vertical slide bearing upon said frame, a ram rigidly supported for sliding motion within said bearing, a tool holder carried by said ram having means rigidly to support a tool extending upwardly beyond all portions of said ram or holder, a work supporting table carried by said frame below the working range of movement of said tool having a central work opening and having means for moving the table relative to the frame, means to reciprocate said ram, and means to move said tool holder positively to move the tool toward the working face at the beginning of each working stroke and away from the working face at the beginning of each return stroke, said head having a tool access opening accessible from below the table through which the tool may be adjusted or replaced, said opening terminating in an upwardly contracting tapered hole, said tool holder comprising a correspondingly tapered plug, said plug being slotted and having a central tool shank receiving opening, and means controlled through said opening for forcing said plug upward into said tapered opening to hold the same rigidly in place, and to clamp said plug about said tool shank.

JOHN RUSSELL WHITENACK.

REFERENCES CITED

The following references are of record in the file of this patent:

UNITED STATES PATENTS

| Number | Name | Date |
|---|---|---|
| 10,873 | William, 2nd | May 2, 1854 |
| 357,539 | Waterman | Aug. 17, 1886 |
| 540,095 | Giesler et al. | May 28, 1895 |
| 581,458 | Goddu | Apr. 27, 1897 |
| 589,011 | Merrill | Aug. 31, 1897 |
| 596,528 | Morton | Jan. 1, 1898 |
| 1,025,152 | Mitts | May 7, 1912 |
| 2,180,477 | Morton | Nov. 21, 1939 |
| 2,263,635 | Larsen | Nov. 25, 1941 |

FOREIGN PATENTS

| Number | Country | Date |
|---|---|---|
| 210,376 | Switzerland | July 15, 1940 |